United States Patent

Giray et al.

Patent Number: 5,377,443
Date of Patent: Jan. 3, 1995

[54] GLASS FISHING WEIGHTS

[76] Inventors: Nancie Giray; Gary L. Giray, both of 904 Vista Del Mar Dr., Aptos, Calif. 95003

[21] Appl. No.: 186,235

[22] Filed: Jan. 25, 1994

Related U.S. Application Data

[63] Continuation-in-part of Ser. No. 57,534, May 4, 1993, abandoned.

[51] Int. Cl.6 .............................................. A01K 91/00
[52] U.S. Cl. ................................. 43/44.9; 43/42.33; 43/44.92
[58] Field of Search ............... 43/44.9, 42.33, 42.32, 43/43.1, 44.92, 44.91

[56] References Cited

U.S. PATENT DOCUMENTS

| | | | |
|---|---|---|---|
| 1,176,631 | 3/1916 | Wells | 43/44.92 |
| 1,240,043 | 9/1917 | Gregory et al. | 43/44.92 |
| 2,006,604 | 7/1935 | Post | 43/42.33 |
| 2,215,764 | 9/1940 | Okesson | 43/42.33 |
| 2,275,076 | 3/1942 | Haynes | 43/44.9 |
| 2,520,444 | 8/1950 | Smith | 43/42.32 |
| 2,672,704 | 2/1950 | Smith | 43/43.1 |
| 2,770,910 | 11/1956 | Gehrig | 43/44.9 |
| 2,813,366 | 11/1957 | Garwood | 43/42.33 |
| 2,938,293 | 5/1960 | Richardson | 43/42.32 |
| 3,415,005 | 5/1966 | Gilham | 43/43.12 |
| 3,834,059 | 9/1974 | Overstreet | 43/43.12 |
| 3,854,235 | 12/1974 | Thompson | 43/43.12 |
| 4,753,030 | 6/1988 | Ziglinski | 43/42.53 |
| 4,796,377 | 1/1989 | Hosegood et al. | 43/43.1 |
| 4,817,326 | 4/1989 | Benjestorf | 43/43.14 |
| 4,870,776 | 10/1989 | Schock | 43/42.33 |
| 4,910,908 | 3/1990 | Rosenburg | 43/44.89 |

FOREIGN PATENT DOCUMENTS

| | | | |
|---|---|---|---|
| 2520973 | 8/1983 | France | 43/43.1 |
| 3728581 | 3/1989 | Germany | 43/43.1 |

Primary Examiner—P. Austin Bradley
Assistant Examiner—James Miner
Attorney, Agent, or Firm—Jeffrey A. Hall

[57] ABSTRACT

A glass fishing weight including a body member composed of glass. The body member may be configured in various geometric shapes such as an orb, an orb having a flat surface, a torpedo shape, split-shot, banana shaped, or other configurations. To prevent rolling of the weight on a surface one or more sides of the body member may be flattened. To secure the body member to a fishing line a holder, swivel, eyelet, tube, or wire may be secured to the body member. Alternatively, a channel may be included in the body member housing hook and loop fastening elements for securing a fishing line or net therein. An identification tag is embedded within the body member allowing physical characteristics of the weights to be identified.

6 Claims, 2 Drawing Sheets

GLASS FISHING WEIGHTS

RELATED APPLICATIONS

This is a continuation-in-part of Ser. No. 08/057,534 filed May 4, 1993 now abandoned.

BACKGROUND OF THE INVENTION

1. Field of Invention

This invention relates to weights or sinkers for fishing lines or nets, and more particularly to glass weights or sinkers for fishing lines or nets.

2. Description of the Related Art

Numerous fishing weights and sinkers have been proposed and implemented for both sport and commercial fishing activities. Various configurations, materials, and attachment means have been proposed and utilized for such purposes. In general, weights added to a fishing line allow the fishermen to throw his bait or lure farther or more accurately. Lead has been the preferred material from which fishing weights have been fabricated due to its high density. Unfortunately, lead is a toxic substance and causes damage to aquatic life and to the fish and mammals that eat aquatic life. Over time lost lead weights and sinkers have accumulated to a point where their impact on streams, lakes and oceans are no longer insignificant. Such pollution is real and is increasing. The manufacturing of lead weights and sinkers involves smelting the lead, this process releases toxic gasses and particulates into the atmosphere.

In the prior art there have been disclosed numerous alternatives to the standard lead weights. For example, U.S. Pat. No. 4,753,030 to Ziiglinski (1988) describes a fishing weight made from a tube of thermoplastic material that is closed at one end and into which lead shot is introduced. While the normal use of this tube would act as a barrier between the lead and water, however, when caught or tangled in branches or other debris this weight is designed to break apart thereby exposing the lead shot to the water. A similar modification of lead weights is seen is U.S. Pat. No. 4,817,326 to Benjestorf (1989) where a casting bubble incorporates a seam which is filled with lead shot. This design is significantly limited because the seam can easily separate thereby releasing both the plastic bubble and the lead shot into the environment.

Another genre of fishing weights and lures includes the use of plastics or glass as a partial or complete substitute for lead. Representative examples include: U.S. Pat. No. 2,770,910 issued to Gehrig (1956): U.S. Pat. No. 2,006,604 issued to Post (1935); U.S. Pat. No. 2,215,764 issued to Okesson et al. (1940); German Patent DE728581 issued to Wait (1989): and French Patent FR002286 issued to Dhuy et al. (1982). However, all such prior weights suffer significant limitations. For example, none of the prior art known to applicant provides a environmentally low impact and non-polluting fishing weight or sinker which is easy to attach mid detach from a fishing line or net, which includes means to prevent rolling of the weight on a surface, or which provides for the identification of such weight according to physical characteristics of the weight.

Accordingly, it is the primary object of this invention to provide an improved glass fishing weight or sinker which is composed of glass and which is environmentally safe, which is easy to attach and detach from a fishing line or net, which may be provided in a form which is non-rollable, and which incorporates identification means therein.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described heroin, a fishing weight is provided, comprising: a body member composed of glass; said body member being geometrically configured and including means to attach said body member to a fishing line; means for preventing said body member from rolling on a surface; and means for identifying said body member so as to distinguish the fishing weight according to physical characteristics.

The attachment means preferably includes means for easily and conveniently attaching and detaching the weight from a fishing line or net. Means for identifying said body member preferably comprise identification means embedded within the body member, but may be otherwise.

In accordance with the present invention there also is provided an environmentally low impact fishing weight, comprising: a body member being composed of glass; said body member being geometrically configured and including a channel adapted to receive and secure a fishing line therein; said channel includes a pair of mating hook and loop fastening elements operably aligned so that when a fishing line is positioned within said channel and said body member is compressed, said pair of mating hook and loop fastening elements combine to secure said fishing line in the channel; means for preventing said body member from rolling on a surface; and means for identifying said body member so as to distinguish the fishing weight according to a characteristic thereof.

The channel in the body member may, in alternative embodiments, be a cavity, bore, groove, slit, or the like. The hook and loop fastening material, may, in alternative embodiments, be replaced with adhesives other fastening means.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principals of the invention.

DESCRIPTION OF THE PREFERRED EMBODIMENTS

Reference will now be made in detail to the present preferred embodiments of the invention as illustrated in the accompanying drawings.

In accordance with the purpose of the present invention, there is provided a fishing weight, comprising: a body member being composed of glass, said body member being geometrically configured and including means to attach said body member to a fishing line; means for preventing said body member from rolling on a surface; and means for identifying said body member, whereby said fishing weight may be distinguished according to a characteristic thereof.

There is also provided, in accordance with the present invention, an environmentally low impact fishing weight, comprising: a body member being composed of glass; said body member being geometrically configured and including a channel adapted to receive and secure a fishing line therein: said channel includes a pair of mating hook and loop fastening elements operably aligned so that when a fishing line is positioned within said channel and said body member is compressed, said pair of mating hook and loop fastening elements combine to secure said fishing line in the channel; means for preventing said body member from rolling on a surface; and means for identifying said body member whereby said body member may be distinguished according to a characteristic thereof.

Figure 1:
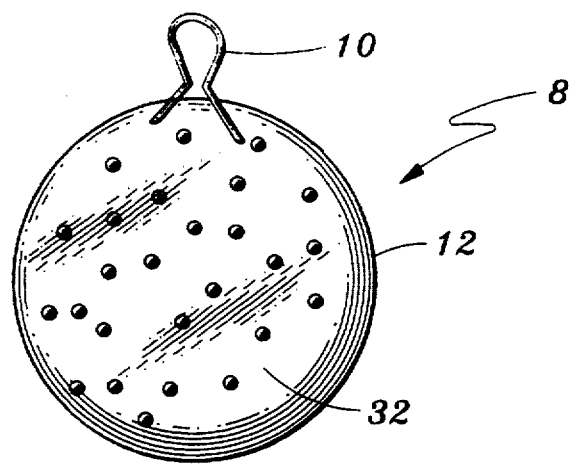
FIG. 1 is a front perspective view of a glass fishing weight, according to the invention.

In FIG. 1, a typical embodiment of the glass fishing weight 8 is illustrated. The weight has a body 12 preferably composed of molded glass, which may be clear, colored, or partially colored, and includes a looped wire holder 10, composed of stainless steel in the preferred embodiment, however brass, copper, polymer, glass and the like may also be used. Body 12 may be composed of plate or tempered glass, and the use of recycled glass lowers the cost of manufacture and provides additional environmental benefits. Body 12 may be any geometric shape such as an orb, torpedo shaped, elongate, round, trapezoidal, pyramidal, bullet shaped, and the like, and may include particles of colored glass 32, or plastic dispersed therein. Looped wire holder 10 is preferably embedded in the glass when cast, and provides means for securing weight 8 to a fishing line 36 or net. Looped wire holder 10 may, in alternative embodiments be replaced by swivel 22, eyelet 28, rings, and other attachment means well known in the art.

Figure 2:
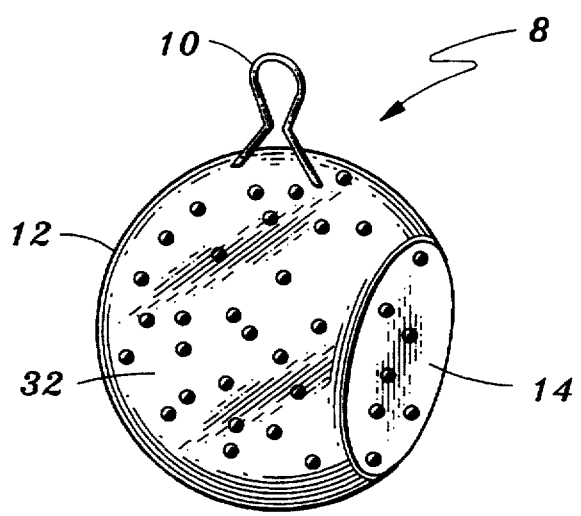
FIG. 2 is a perspective view of another embodiment of such glass fishing weight shown with a flattened side, according to the invention.

Referring now to FIG. 2, at least one flat surface 14 may be included providing means to prevent weight 8 from rolling on a surface, such as a boat deck or floor, preventing loss and the slippage of the weight overboard. Flat surface 14 may be configured within the mold when casting body 21 and holder 10. Of course, weight 8 may be provided without surface 14 albeit without the advantages mentioned.

Figure 3:
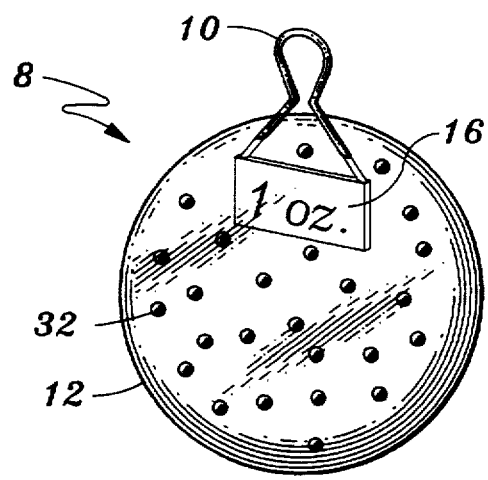
FIG. 3 is a perspective view of such glass fishing weight including an identification tag 16 embedded therein, according to the invention.

In FIG. 3 an identification tag 16 is shown embedded within body 12. Tag 16 provides a means for identifying body member 12 according to a characteristic thereof such as weight, size, or the like. Identification tag 16 is preferably composed of stainless steel and embedded within body 12, however, alternative materials such as plastic, colored glass, or the like may be used. Tag 16 is preferably attached to holder 10, however, it is also satisfactory to provide tag 216 unattached to holder 10 within body 12.

Figure 4:
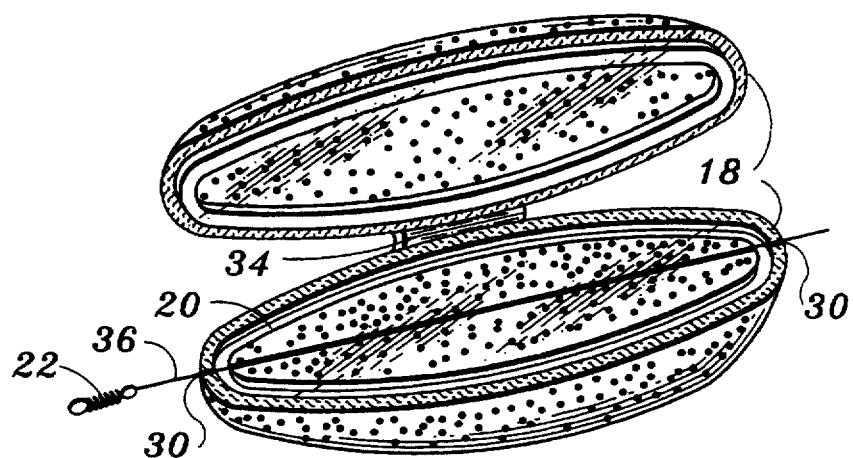
FIG. 4 is a perspective view of a glass fishing weight in a split-shot configuration, according to the invention.
Figure 5:
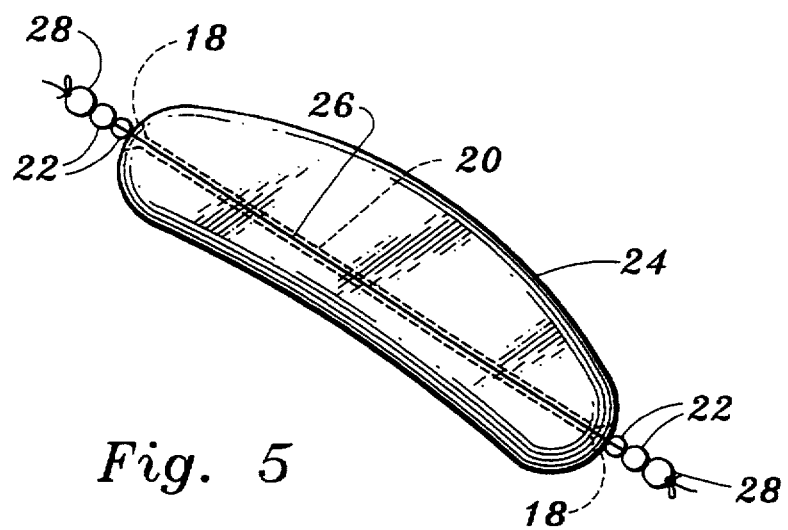
FIG. 5 is a perspective view of a glass fishing weight including a swivel attachment, according to the invention.

Referring now to FIG. 4 and 5, split-shot and banana shaped weight are shown including a channel 20, preferably with flared end to protect ends 18. Channel 20 may also be used to receive and secure a fishing line therein. In this embodiment a pair of mating hook and loop fastening elements 30 are operably aligned proximate to channel 20 and aligned so that when body 12 is compressed the fastening elements combine to secure the fishing line within body 12. Preferably, the hook and loop fastening elements 30 am provided as strips having a self-adhesive layer of adhesive on one side thereof. However, alternative configurations and attachments of the hook and loop fastening elements 30 are contemplated such as patches, strips, rings, and the like, which may be secured by adhesives, fusion, or integrally formed with the weight. Of course, in alternative embodiments, channel 12 may be replaced by a tube, cavity, bore, groove, slit or the like. In alternative embodiments, hook and loop fastening elements 30 may be replaced by adhesives, or other fastening means. A hinge 34 is preferably provided in embodiments such as that shown in FIG. 4 with a split-shot configuration. Hook and loop fastening elements 30 and hinge 34 secure line 36 thereto, and if glass fishing weight 8 is smashed or cracked against a rock weight 8 remains secured to line 36 because of the hook and loop fastening material and hinge 34.

From the detailed description above, a number of advantages inherent in the glass fishing weight of the present invention are evident:

(a) The weight of the present invention is ideally made from recycled glass.

(b) The weight of the present invention is non-polluting.

(c) The weight of the present invention would have no pores in which bacteria could breed thereby eliminating unwanted odors.

(d) The weight of the present invention is easily washed and cleaned.

(e) The weight of the present invention is non-rollable, preventing loss thereof.

(f) The weight of the present invention is transparent or translucent and therefore does not disturb or alarm fish.

(g) The weight of the present invention can be used closer to the bait or lure than prior weights due to its transparency or translucence.

(h) The weight of the present invention does not differ significantly in specific gravity from current lead weights of the same size so no adaptation are needed for any other fishing gear.

(i) The weights of the present invention can be made from any color of glass or combination of colors with embedded glass particles useful to entice fish.

(j) The weight of the present invention, when provided in a torpedo configuration allows the fishing line to slide through it so fish do not feel any resistance when taking the bait.

(k) The weight of the present invention when provided with swivels allows the bait when attached to the line to spin in the water without tangling the line while simultaneously attracting fish.

In operation and use, the glass fishing weight of the present invention is identical to that of weights in present use. In FIGS. 1—3 holder 10 will have sufficient tensile strength to support itself when suspended from a fishing line, a swivel or a commonly used fishing release device. A loop is preferably formed in the fishing line and then passed through holder 10. The loop is then wrapped around the glass body 12, and then puled tight around holder 10. Another means of attachment would be to pass the line through holder 10 and then a common fishermen's knot is tied to secure it. When attaching the weight to a net a snap is place on holder 10 trod then hooked to the net wherever the fisherman desires.

In the embodiment utilizing channel 20, such as shown in FIG. 5, a fishing line is passed through channel 10 and then hook and loop fastening elements 30 are secured around the line. Of course, a swivel may also be used and tied to the line to prevent the weight from slipping off the line. A leader line may then be attached to the other half of the swivel with a hook attached to the end of the leader. The weight then glides freely along the line allowing the fish, when taking the bait, to notice no resistance from the weight. When used in nets, weight 8 is permanently attached to the net at intervals on the perimeter lines by passing the line through channel 20 and then kept in position with the net webbing.

To use the embodiment of the weight shown in FIG. 5, a fishing line is preferably passed through eyelet 28 and secured with a common fishermen's knot, then a leader line is tied to the eyelet 28 and a baited hook is attached to the end of the leader line. When the weight is immersed in water the current causes the swivels 22 to allow the curved glass body 24 to rotate, creating the illusion that the bait is alive. Wire 26 provides structural integrity and support of curved glass body 24.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the applicant's general inventive concept.

What is claimed is:

1. An environmentally low impact fishing weight, comprising:
    a body member being composed of glass; said body member being geometrically configured and including a channel adapted to receive and secure a fishing line therein; a pair of mating hook and loop fastening elements are operably aligned on said body member so that when a fishing line is positioned within said channel and said body member is compressed, said pair of mating hook and loop fastening elements combine to secure said fishing line in the channel;
    means for preventing said body member from rolling on a surface; and
    means for identifying said body member, whereby the fishing weight may be distinguished according to a characteristic thereof.

2. The fishing weight of claim 1, wherein said means for preventing said body member from rolling on a surface comprises providing the body member with at least one flattened side.

3. The fishing weight of claim 1, wherein said means for identifying said body member comprises an identification tag embedded within said body member.

4. The fishing weight of claim 1, wherein said body member is composed of clear glass.

5. The fishing weight of claim 1, wherein said body member is composed of recycled glass.

6. The fishing weight of claim 1, wherein said body member further includes a looped wire holder to secure said body member to a fishing line.

* * * * *

UNITED STATES PATENT AND TRADEMARK OFFICE
CERTIFICATE OF CORRECTION

PATENT NO. : 5,377,443
DATED : January 3, 1995
INVENTOR(S) : Gray et al.

It is certified that error appears in the above-indentified patent and that said Letters Patent is hereby corrected as shown below:

On the title page, items [19] and [76] should read as follows:

—[19] Gray et al.

[76] Inventors: Nancie L. Gray; Gary L. Gray—.

Signed and Sealed this

Fourteenth Day of March, 1995

Attest:

BRUCE LEHMAN

*Attesting Officer*   Commissioner of Patents and Trademarks